United States Patent
Bailey et al.

(10) Patent No.: US 11,513,572 B2
(45) Date of Patent: Nov. 29, 2022

(54) SYSTEMS AND METHODS FOR AUTOMATED STARTUP AND BYPASS AT AN EDGE DATACENTER

(71) Applicant: Dell Products L.P., Round Rock, TX (US)

(72) Inventors: Mark M. Bailey, Round Rock, TX (US); Trey S. Wiederhold, Cedar Park, TX (US); Colin Mahaffey, Austin, TX (US); Tyler B. Duncan, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 68 days.

(21) Appl. No.: 16/931,152

(22) Filed: Jul. 16, 2020

(65) Prior Publication Data

US 2022/0019272 A1   Jan. 20, 2022

(51) Int. Cl.
| | |
|---|---|
| *G06F 1/28* | (2006.01) |
| *G06F 1/20* | (2006.01) |
| *G06F 1/3287* | (2019.01) |
| *H02J 13/00* | (2006.01) |
| *H02J 9/00* | (2006.01) |
| *H02J 9/06* | (2006.01) |
| *G06F 1/3206* | (2019.01) |

(52) U.S. Cl.
CPC ............ *G06F 1/206* (2013.01); *G06F 1/3206* (2013.01); *G06F 1/3287* (2013.01); *H02J 9/005* (2013.01); *H02J 9/061* (2013.01); *H02J 13/00001* (2020.01)

(58) Field of Classification Search
CPC ................. G06F 1/20; G06F 1/28; G06F 1/32
See application file for complete search history.

(56) References Cited

U.S. PATENT DOCUMENTS

| | | | | |
|---|---|---|---|---|
| 10,432,017 | B1* | 10/2019 | Morales | .................. H02J 9/061 |
| 2009/0150818 | A1* | 6/2009 | Bakhreiba | ............ G06F 3/04883 |
| | | | | 715/771 |
| 2009/0197156 | A1* | 8/2009 | Goto | ................... H02J 7/00309 |
| | | | | 429/93 |
| 2009/0230772 | A1* | 9/2009 | Caudill | ..................... H02J 3/46 |
| | | | | 307/44 |
| 2015/0036284 | A1* | 2/2015 | Ross | .................... G11B 33/142 |
| | | | | 361/679.46 |

* cited by examiner

*Primary Examiner* — Paul B Yanchus, III
(74) *Attorney, Agent, or Firm* — Jackson Walker L.L.P.

(57) ABSTRACT

An information handling system may include a direct-current power supply, a plurality of information handling resources configured to receive electrical energy from the direct-current power supply, a thermal control subsystem configured to regulate temperature within the information handling system, and a control subsystem configured to, when temperature proximate to at least one of the direct-current power supply and the plurality of information handling resources is outside of temperature specifications: isolate the direct-current power supply from a mains power source of the information handling system and deactivate the direct-current power supply to prevent delivery of electrical energy to the plurality of information handling resources.

21 Claims, 2 Drawing Sheets

US 11,513,572 B2

SYSTEMS AND METHODS FOR AUTOMATED STARTUP AND BYPASS AT AN EDGE DATACENTER

TECHNICAL FIELD

The present disclosure relates in general to information handling systems, and more particularly to automated startup and bypass at an edge datacenter.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Deployment of information handling systems at non-standard edge locations may present challenges in terms of usage and behavioral requirements. Such non-standard edge locations may include small, modular datacenters which include their own power conditioning, environmental controls, and remote monitoring capabilities. Information handling systems may include many components that must operate within particular ranges of environmental conditions (e.g., temperature and humidity) in order to operate efficiently or in order to operate without damage to such components. However, such non-standard edge locations may be outdoors, remote, and unmanned.

SUMMARY

In accordance with the teachings of the present disclosure, the disadvantages and problems associated with automated startup and bypass at an edge datacenter have been reduced or eliminated.

In accordance with embodiments of the present disclosure, an information handling system may include a direct-current power supply, a plurality of information handling resources configured to receive electrical energy from the direct-current power supply, a thermal control subsystem configured to regulate temperature within the information handling system, and a control subsystem configured to, when temperature proximate to at least one of the direct-current power supply and the plurality of information handling resources is outside of temperature specifications: isolate the direct-current power supply from a mains power source of the information handling system and deactivate the direct-current power supply to prevent delivery of electrical energy to the plurality of information handling resources.

In accordance with these and other embodiments of the present disclosure, a control subsystem for use in connection with an information handling system comprising an direct-current power supply, a plurality of information handling resources configured to receive electrical energy from the direct-current power supply, and a thermal control subsystem configured to regulate temperature within the information handling system, wherein the control subsystem is configured to, when temperature proximate to at least one of the direct-current power supply and the plurality of information handling resources is outside of temperature specifications: isolate the direct-current power supply from a mains power source of the information handling system and deactivate the direct-current power supply to prevent delivery of electrical energy to the plurality of information handling resources.

In accordance with these and other embodiments of the present disclosure, a method may be provided in connection with an information handling system comprising an direct-current power supply, a plurality of information handling resources configured to receive electrical energy from the direct-current power supply, and a thermal control subsystem configured to regulate temperature within the information handling system, wherein the control subsystem is configured to, when temperature proximate to at least one of the direct-current power supply and the plurality of information handling resources is outside of temperature specifications. The method may include isolating the direct-current power supply from a mains power source of the information handling system and deactivating the direct-current power supply to prevent delivery of electrical energy to the plurality of information handling resources.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
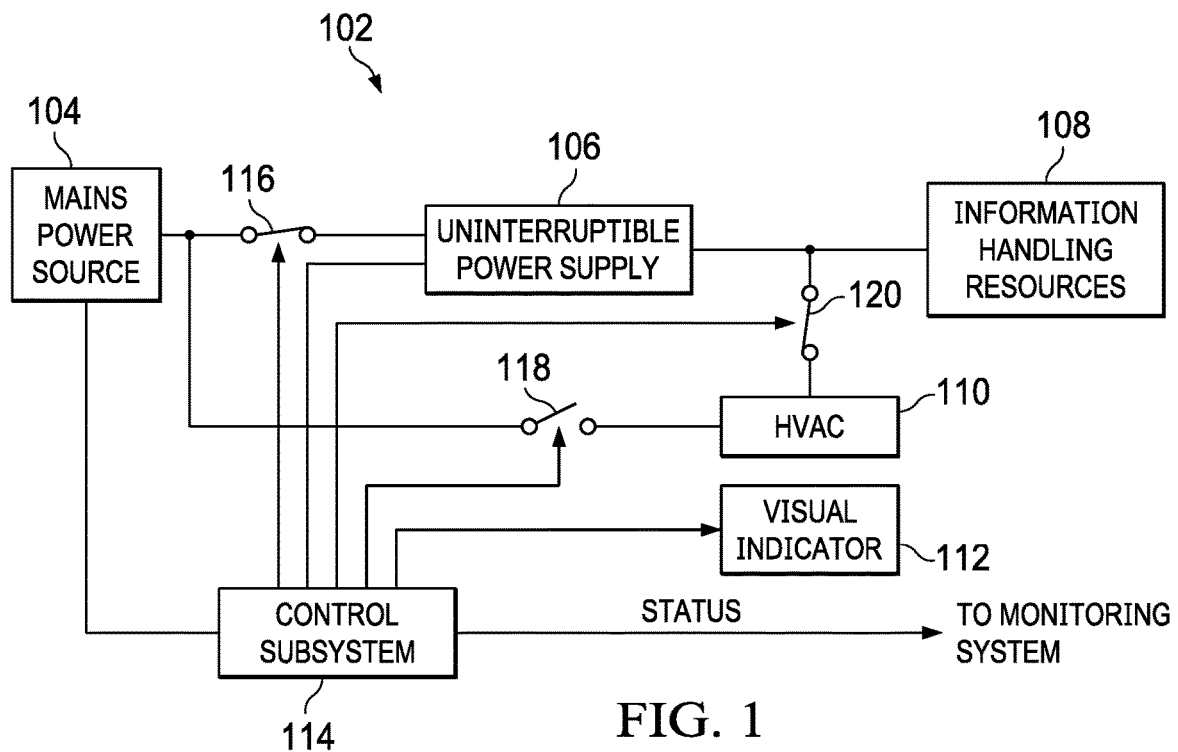
FIG. 1 illustrates a block diagram of an example information handling system, in accordance with certain embodiments of the present disclosure.
Figure 2:
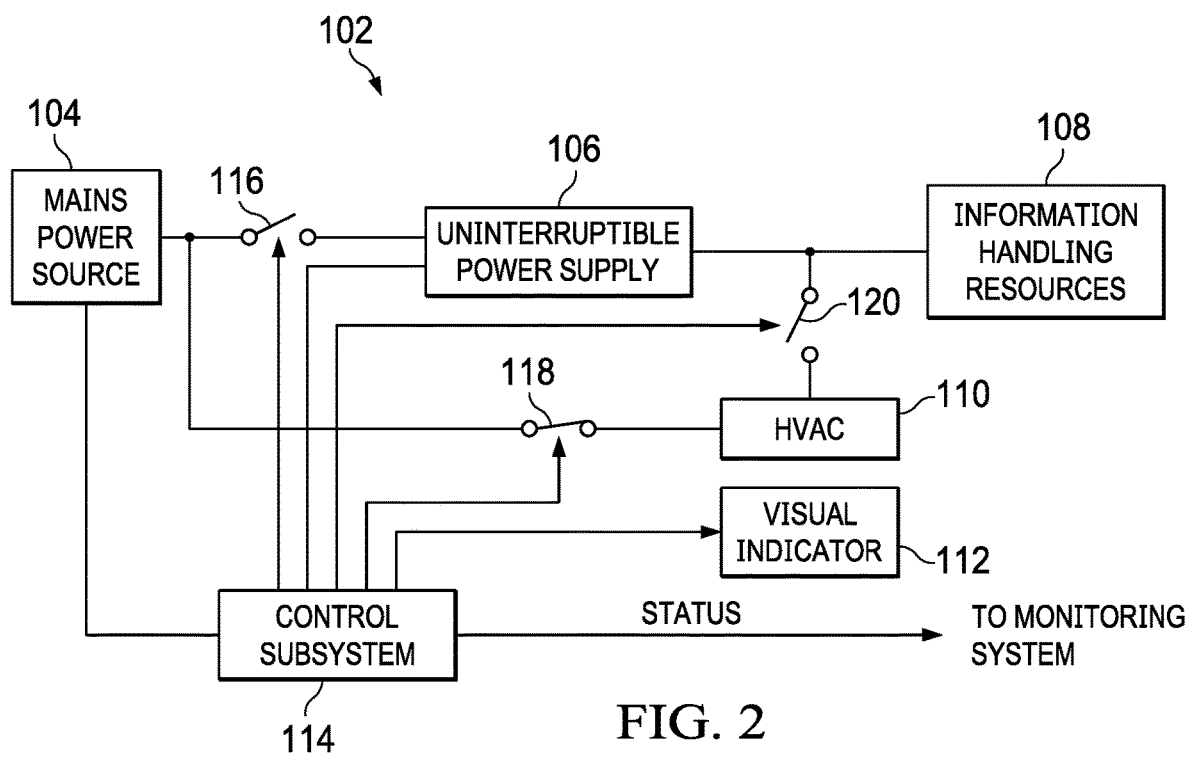
FIG. 2 illustrates a block diagram of the example information handling system of FIG. 1, wherein a temperature proximate to an uninterruptible power supply and/or information handling resources is outside an allowable temperature range, in accordance with certain embodiments of the present disclosure.
Figure 3:
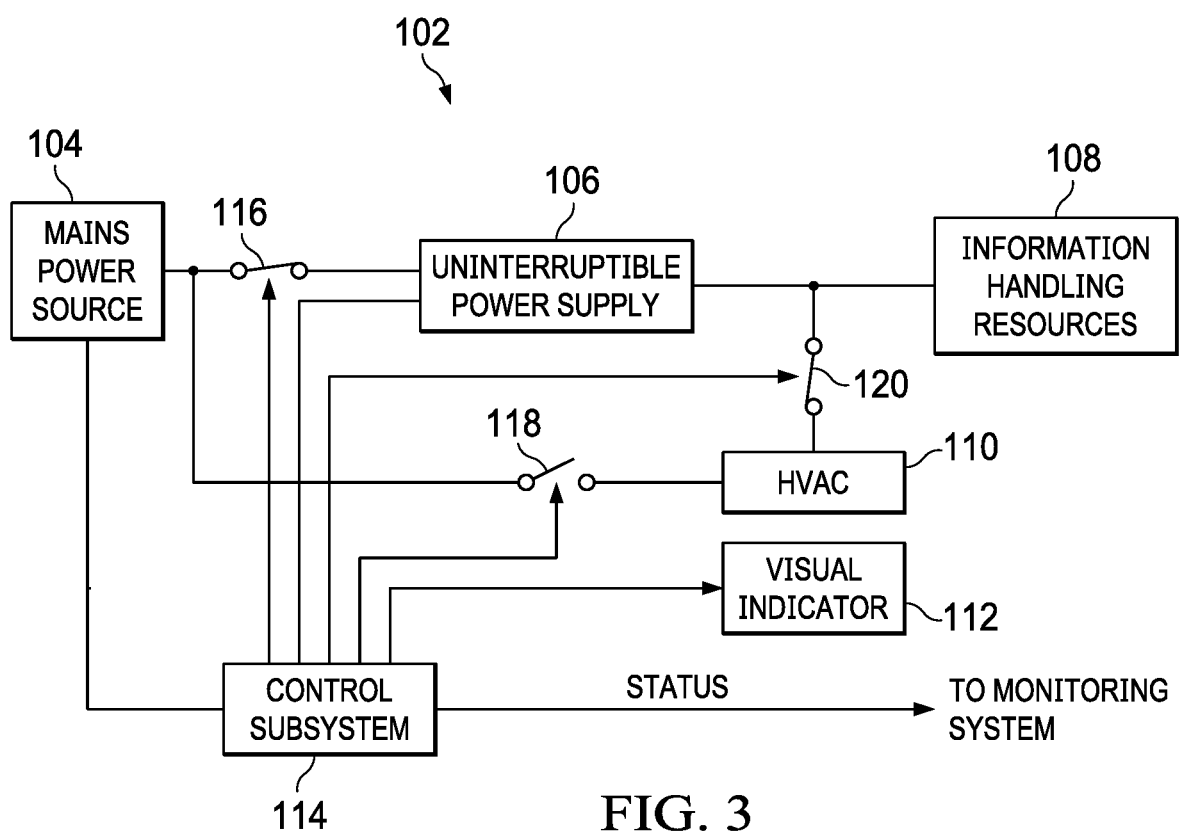
FIG. 3 illustrates a block diagram of the example information handling system of FIG. 1, wherein a temperature proximate to an uninterruptible power supply and/or infor-

Preferred embodiments and their advantages are best understood by reference to FIGS. 1 through 3, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more busses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), busses, memories, I/O devices and/or interfaces, storage resources, network interfaces, motherboards, and/or any other components and/or elements of an information handling system.

FIG. 1 illustrates a block diagram of an example information handling system 102, in accordance with certain embodiments of the present disclosure. In some embodiments, information handling system 102 may comprise a server. In these and other embodiments, information handling system 102 may comprise a remote datacenter. As depicted in FIG. 1, information handling system 102 may include a mains power source 104, an uninterruptable power supply (UPS) 106, information handling resources 108, a heating, ventilation, and air conditioning subsystem (HVAC) 110, a visual indicator 112, a control subsystem 114, and switches 116, 118, and 120.

Mains power source 104 may be a general-purpose alternating-current (AC) or direct-current (DC) electric power supply. Mains power source 104 may comprise the form of electrical power that is delivered to homes and businesses (e.g., the form of electrical power that consumers use when they plug items such as domestic appliances, televisions and electric lamps into wall outlets). Other terms for mains power source 104 may include utility power, power grid, domestic power, and/or wall power. In some embodiments, mains power source 104 may include a power source that generates electrical energy local to information handling system 102, such as one or more solar panels.

UPS 106 may comprise an electrical apparatus configured to provide electrical energy to components of information handling system 102 (e.g., information handling resources 108 and HVAC 110) when mains power source 104 fails or becomes unavailable. As shown in FIG. 1, UPS 106 may be electrically coupled to mains power source 104 via switch 116. Although FIG. 1 depicts the presence of UPS 106, in some embodiments, another direct-current power source may be used instead of a UPS.

Information handling resources 108 may comprise any suitable component systems, devices, or apparatuses of information handling system 102, including without limitation processors, service processors, basic input/output systems (BIOSs), buses, memories, I/O devices and/or interfaces, storage resources, network interfaces, motherboards, and/or any other components and/or elements of an information handling system. As shown in FIG. 1, information handling resources 108 may be electrically coupled to and may derive electrical energy from UPS 106.

HVAC 110 may comprise any suitable system, device, or apparatus configured to regulate a temperature within information handling system 102, in order to maintain UPS 106, information handling resources 108, and/or other components of information handling system 102 within desirable operating ranges. As shown in FIG. 1, HVAC 110 may be electrically coupled to mains power source 104 via switch 118. Also as shown in FIG. 1, HVAC 110 may be electrically coupled to UPS 106 via switch 120.

Visual indicator 112 may comprise a light, light-emitting diode, or other human-perceptible visual indicator configured to indicate an operational status of information handling system 102, as described in greater detail below.

Control subsystem 114 may be any suitable system, device, or apparatus configured to control switches 116, 118, and 120 in order to sequence operation of UPS 106 and information handling resources 108 based on one or more temperatures proximate to UPS 106 and information handling resources 108, to prevent damage to UPS 106 and information handling resources 108 that may occur if UPS 106 and information handling resources 108 operate outside allowable temperature ranges. Accordingly, control system 114 may include any suitable collection of logic gates, logic switches, temperature sensors, thermostats, and/or other devices to carry out the functionality described herein. Control subsystem 114 may also be configured to communicate status information, for example to a monitoring system, to indicate an operational status of information handling system 102, as described in greater detail below.

Each of switches 116, 118, and 120 may comprise any suitable electronic or electromechanical switches (e.g., contactors) configured to be selectively activated (e.g., closed, on, enabled) and deactivated (e.g., open, off, disabled) based on one or more control signals generated by control subsystem 114.

In operation, as shown in FIG. 2, when a temperature proximate to UPS 106 and/or information handling resources 108 is outside of an allowable temperature range (e.g., below a minimum allowable temperature or above a maximum allowable temperature), control subsystem 114 may deactivate switches 116 and 120, activate switch 118, and deactivate operation of UPS 106. Deactivation of switch 116 may isolate UPS 106 from mains power source 104 and, coupled with the deactivation of UPS 106, may protect UPS 106 from operating outside of its temperature specifications. Likewise, deactivation of UPS 106 may protect information handling resources 108 from operating outside of their temperature specifications.

Further, activation of switch 118 and deactivation of switch 120 may allow HVAC 110 to continue to draw electrical energy from mains power source 104, in order to regulate temperatures of information handling system 102 to return temperatures proximate to UPS 106 and information handling resources 108 to within the temperature specifications of UPS 106 and information handling resources 108.

In addition, when temperatures are outside of the temperature specifications for UPS 106 and/or information handling resources 108, control subsystem 114 may cause visual indicator 112 to illuminate, thus providing a visual indication to a user (e.g., administrator or technician) that temperatures may be outside of temperature specifications for UPS 106 and/or information handling resources 108.

Also, when temperatures are outside of the temperature specifications for UPS 106 and/or information handling resources 108, control subsystem 114 may communicate status information to a monitoring system (e.g., a monitoring system remote to information handling system 102) to indicate that temperatures may be outside of temperature specifications for UPS 106 and/or information handling resources 108.

Furthermore, as shown in FIG. 3, when a temperature proximate to UPS 106 and/or information handling resources 108 is within an allowable temperature range (e.g., above a minimum allowable temperature and below a maximum allowable temperature), control subsystem 114 may activate switches 116 and 120, deactivate switch 118, and activate operation of UPS 106. Activation of switch 116 may couple UPS 106 to mains power source 104 allowing UPS 106 to recharge from UPS 106. In addition, activation of UPS 106 may provide electrical energy to information handling resources 108 to enable operation of information handling resources.

Further, deactivation of switch 118 and activation of switch 120 may allow HVAC 110 to continue to draw electrical energy from UPS 106, in order to regulate temperatures of information handling system 102 to maintain such temperatures within the temperature specifications of UPS 106 and information handling resources 108.

In addition, control subsystem 114 may cause visual indicator 112 to cease illumination, thus providing a visual indication to a user (e.g., administrator or technician) that temperatures may be within temperature specifications for UPS 106 and/or information handling resources 108.

Also, when temperatures are within the temperature specifications for UPS 106 and/or information handling resources 108, control subsystem 114 may communicate status information to a monitoring system (e.g., a monitoring system remote to information handling system 102) to indicate that temperatures may be within temperature specifications for UPS 106 and/or information handling resources 108.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described above, the principles of the present disclosure may be implemented using any number of techniques, whether currently known or not. The present disclosure should in no way be limited to the exemplary implementations and techniques illustrated in the figures and described above.

Unless otherwise specifically noted, articles depicted in the figures are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. An information handling system comprising:
   a direct-current power supply;
   a plurality of information handling resources configured to receive electrical energy from the direct-current power supply;

a thermal control subsystem configured to regulate temperature within the information handling system; and a control subsystem configured to, when temperature proximate to at least one of the direct-current power supply and the plurality of information handling resources is outside of temperature specifications:

isolate the direct-current power supply from a mains power source of the information handling system;

deactivate the direct-current power supply; and prevent delivery of any electrical energy to the plurality of information handling resources.

2. The information handling system of claim 1, wherein the control subsystem is further configured to, when temperature proximate to at least one of the direct-current power supply and the plurality of information handling resources is outside of the temperature specifications, decouple the thermal control subsystem from the direct-current power supply and couple the thermal control subsystem to the mains power source.

3. The information handling system of claim 2, wherein the control subsystem is further configured to, when the temperature proximate to at least one of the direct-current power supply and the plurality of information handling resources is within the temperature specifications, couple the thermal control subsystem to the direct-current power supply and decouple the thermal control subsystem to the mains power source.

4. The information handling system of claim 1, wherein the control subsystem is further configured to, when the temperature proximate to at least one of the direct-current power supply and the plurality of information handling resources is within the temperature specifications:

couple the direct-current power supply to the mains power source; and activate the direct-current power supply to deliver electrical energy to the plurality of information handling resources.

5. The information handling system of claim 1, wherein the control subsystem is further configured to cause a visual indication that temperature proximate to at least one of the direct-current power supply and the plurality of information handling resources is outside of the temperature specifications.

6. The information handling system of claim 1, wherein the control subsystem is further configured to communicate status information indicating that temperature proximate to at least one of the direct-current power supply and the plurality of information handling resources is outside of the temperature specifications.

7. The information handling system of claim 1, wherein the direct-current power supply is an uninterruptable power supply.

8. A control subsystem for use in connection with an information handling system comprising a direct-current power supply, a plurality of information handling resources configured to receive electrical energy from the direct-current power supply, and a thermal control subsystem configured to regulate temperature within the information handling system, wherein the control subsystem is configured to, when temperature proximate to at least one of the direct-current power supply and the plurality of information handling resources is outside of temperature specifications:

isolate the direct-current power supply from a mains power source of the information handling system;

deactivate the direct-current power supply; and prevent delivery of any electrical energy to the plurality of information handling resources.

9. The control subsystem of claim 8, further configured to, when temperature proximate to at least one of the direct-current power supply and the plurality of information handling resources is outside of the temperature specifications, decouple the thermal control subsystem from the direct-current power supply and couple the thermal control subsystem to the mains power source.

10. The control subsystem of claim 9, further configured to, when the temperature proximate to at least one of the direct-current power supply and the plurality of information handling resources is within the temperature specifications, couple the thermal control subsystem to the direct-current power supply and decouple the thermal control subsystem to the mains power source.

11. The control subsystem of claim 8, further configured to, when the temperature proximate to at least one of the direct-current power supply and the plurality of information handling resources is within the temperature specifications:

couple the direct-current power supply to the mains power source; and activate the direct-current power supply to deliver electrical energy to the plurality of information handling resources.

12. The control subsystem of claim 8, further configured to cause a visual indication that temperature proximate to at least one of the direct-current power supply and the plurality of information handling resources is outside of the temperature specifications.

13. The control subsystem of claim 8, further configured to communicate status information indicating that temperature proximate to at least one of the direct-current power supply and the plurality of information handling resources is outside of the temperature specifications.

14. The control subsystem of claim 8, wherein the direct-current power supply is an uninterruptable power supply.

15. A method comprising, in connection with an information handling system comprising a direct-current power supply, a plurality of information handling resources configured to receive electrical energy from the direct-current power supply, a thermal control subsystem configured to regulate temperature within the information handling system, and a control subsystem, when temperature proximate to at least one of the direct-current power supply and the plurality of information handling resources is outside of temperature specifications:

isolating the direct-current power supply from a mains power source of the information handling system;

deactivating the direct-current power supply; and preventing delivery of any electrical energy to the plurality of information handling resources.

16. The method of claim 15, further comprising, when temperature proximate to at least one of the direct-current power supply and the plurality of information handling resources is outside of the temperature specifications, decoupling the thermal control subsystem from the direct-current power supply and coupling the thermal control subsystem to the mains power source.

17. The method of claim 16, further comprising, when the temperature proximate to at least one of the direct-current power supply and the plurality of information handling resources is within the temperature specifications, coupling the thermal control subsystem to the direct-current power supply and decoupling the thermal control subsystem to the mains power source.

18. The method of claim 15, further comprising, when the temperature proximate to at least one of the direct-current power supply and the plurality of information handling resources is within the temperature specifications:
- coupling the direct-current power supply to the mains power source; and
- activating the direct-current power supply to deliver electrical energy to the plurality of information handling resources.

19. The method of claim 15, further comprising causing a visual indication that temperature proximate to at least one of the direct-current power supply and the plurality of information handling resources is outside of the temperature specifications.

20. The method of claim 15, further comprising communicating status information indicating that temperature proximate to at least one of the direct-current power supply and the plurality of information handling resources is outside of the temperature specifications.

21. The method of claim 15, wherein the direct-current power supply is an uninterruptable power supply.

* * * * *